United States Patent
Balakrishnan et al.

(10) Patent No.: US 9,742,294 B2
(45) Date of Patent: Aug. 22, 2017

(54) POWER CONVERTER CONTROLLER UTILIZING EXTERNAL RESISTOR FOR PROGRAMMING OPERATING PARAMATER DURING STARTUP

(71) Applicant: POWER INTEGRATIONS, INC., San Jose, CA (US)

(72) Inventors: Vikram Balakrishnan, Mountain View, CA (US); Qing McIntosh, San Jose, CA (US); Roland Sylvere Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/001,470

(22) Filed: Jan. 20, 2016

(65) Prior Publication Data
US 2017/0207711 A1    Jul. 20, 2017

(51) Int. Cl.
*H02M 1/36*   (2007.01)
*H02M 3/335*   (2006.01)
*H02M 1/00*   (2006.01)

(52) U.S. Cl.
CPC ......... *H02M 3/33515* (2013.01); *H02M 1/36* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 2005/0001635 A1* | 1/2005 | Kojima | B60L 7/06 324/713 |
| 2011/0032024 A1* | 2/2011 | Chen | H03K 17/687 327/524 |
| 2014/0218976 A1* | 8/2014 | Luo | H02M 1/08 363/21.01 |
| 2015/0331057 A1* | 11/2015 | Imaizumi | G01R 31/3624 324/427 |
| 2016/0036324 A1* | 2/2016 | Hofmann | H02M 3/156 315/210 |
| 2016/0242258 A1* | 8/2016 | Agarwal | H05B 33/0815 |

\* cited by examiner

*Primary Examiner* — Jeffrey Gblende
(74) *Attorney, Agent, or Firm* — Christensen O'Connor Johnson Kindness PLLC (57) ABSTRACT

A controller for use in a power converter includes an initialization circuit coupled to a sense terminal coupled to an external resistor to receive a sense voltage from external resistor during a startup mode of the power converter. The sense terminal is coupled to sense an output current of the power converter after the startup mode of the power converter is complete. A decoder circuit is coupled to receive the sense voltage from the initialization circuit during the startup mode of the power converter. The decoder circuit is coupled to sense a voltage across an external resistor during the startup mode of the power converter to determine a value of the external resistor to set an operating parameter of the power converter in response to the value of the external resistor.

18 Claims, 5 Drawing Sheets

POWER CONVERTER CONTROLLER UTILIZING EXTERNAL RESISTOR FOR PROGRAMMING OPERATING PARAMATER DURING STARTUP

BACKGROUND INFORMATION

Field of the Disclosure

The present invention relates generally to power converters, and more specifically to programming an operating parameter for a power controller based on the value of an external resistor.

Background

Electronic devices use power to operate. Switched mode power converters are commonly used due to their high efficiency, small size, and low weight to power many of today's electronics. Conventional wall sockets provide a high voltage alternating current. In a switch mode power converter, a high voltage alternating current (ac) input is converted to provide a well-regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

An example controller that can set a regulation parameter by sensing an external resistor is described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Controllers may be used for a multitude of purposes and applications. Many applications have cost goals that limit the functionality of the integrated circuit in order to achieve these goals. The package in which the controller is housed can significantly contribute to its cost. The number of pins or terminals that it uses in turn influences the cost of the integrated package. The number of pins that can be used to meet cost goals often limits the number of features or options that can be provided to customers using the controller.

An example of this can be appreciated with respect to output constant current (CC) regulation, which is commonly provided by controllers used in power converter applications. Depending on the customer or the application, the desired CC parameter and other requisite features can vary. One such way is to trim a constant current profile and other feature combinations for each desired customer. However, in order to satisfy customers with a variety of options, it is often necessary to have an inventory of the same controller with all the variations of profiles available simultaneously. This introduces additional manufacturing costs and overhead associated with holding inventory.

To reduce the overhead associated with holding inventory of variations of the same controller, examples in accordance with the teachings of the present invention include a controller that is programmable such that the required inventory can be reduced. An example controller in accordance with the teachings of the present invention can use single terminal to provide multiple functions. In one example, a current sense terminal of the controller can determine the voltage across an external resistor in a startup mode. The value of the external resistor can set a parameter within the controller.

After the startup mode is complete, the current sense terminal may operate as a sense terminal for sensing the output current of a power converter.

Figure 1:
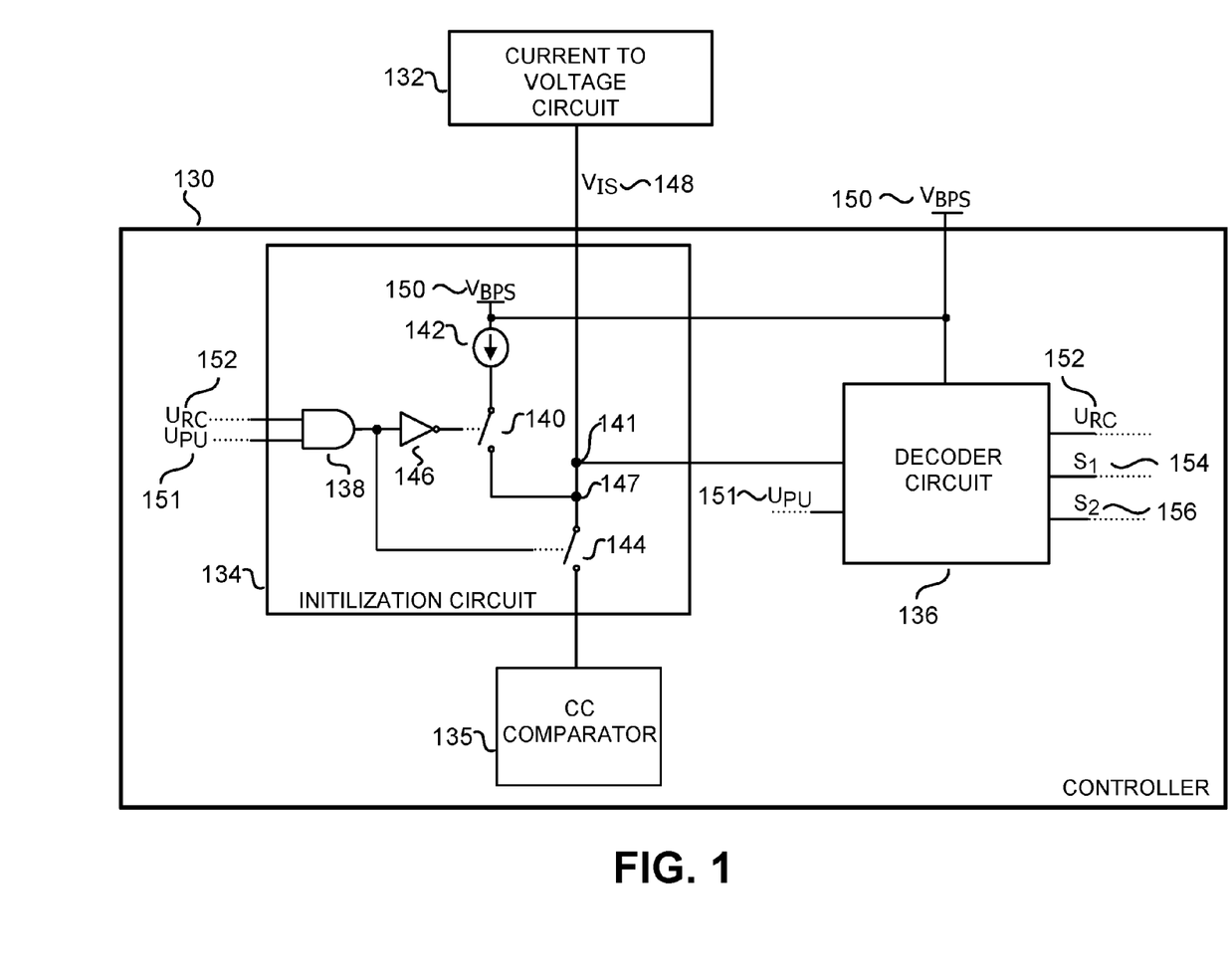
FIG. 1 is a block diagram illustrating one example of a controller for programming an operating parameter for a power controller in accordance with the teachings of the present disclosure.

To illustrate, FIG. 1 is a block diagram that depicts one example of a controller of a power converter for programming a constant current profile in accordance with the teachings of the present invention. FIG. 1 includes a controller 130 coupled to a current to voltage circuit block 132. Controller 130 further includes an initialization circuit 134 coupled to a decoder circuit 136 and a constant current (CC) comparator 135 as shown. In operation, controller 130 may perform multiple functions. At startup, controller 130 may set a CC profile by determining the voltage across an external resistor included in the current to voltage circuit block 132. In one example, the current to voltage circuit block 132 may be a resistor divider circuit including the external resistor coupled to the output of the power converter. The sense voltage $V_{IS}$ 148 of the current to voltage circuit block 132 is coupled as an input to the decoder circuit 136. The decoder circuit 136 outputs a binary code in response to a value of the sense voltage $V_{IS}$ 148. In one example, the output of the decoder circuit 136 includes 2 bits, S1 154 and S2 156. Once the operation of the decoder circuit 136 is complete, the decoder circuit 136 sets a resistor programming signal $U_{RC}$ 152 to a logic high. After startup, the initialization circuit 134 may enable the CC comparator circuit 135 for regulating the output current of the power converter by closing switch 144 and opening switch 140.

Initialization circuit 134 includes a logic gate 138, inverter 146, switches 140, 144, and a current source 142. In one example, logic gate 138 is an AND gate. Logic gate 138 is coupled to receive a resistor programming signal $U_{RC}$ 152 and a power up signal $U_{PU}$ 151. In one example, the power up signal $U_{PU}$ 151 may be a bypass voltage reaching a threshold. In another example, the power up signal $U_{PU}$ 151 may be a digital signal indicating a startup sequence is complete. At startup, the resistor programming signal $U_{RC}$ 152 and power up signal $U_{PU}$ 151 are logic low. Thus, the output of logic gate 138 is a logic low at startup. Logic gate 138 is coupled to inverter 146. As such, switch 140 is closed, and switch 144 is opened at startup. Current source 142 is coupled to a bypass voltage $V_{BPS}$ 150. Current source 142 provides current in the direction of node 147 and node 141 during startup in order to sense the sense voltage $V_{IS}$ 148 from the current to voltage circuit block 132. The sense voltage $V_{IS}$ 148 is an input to the decoder circuit 136 which will be further described in FIG. 2A.

Figure 2A:
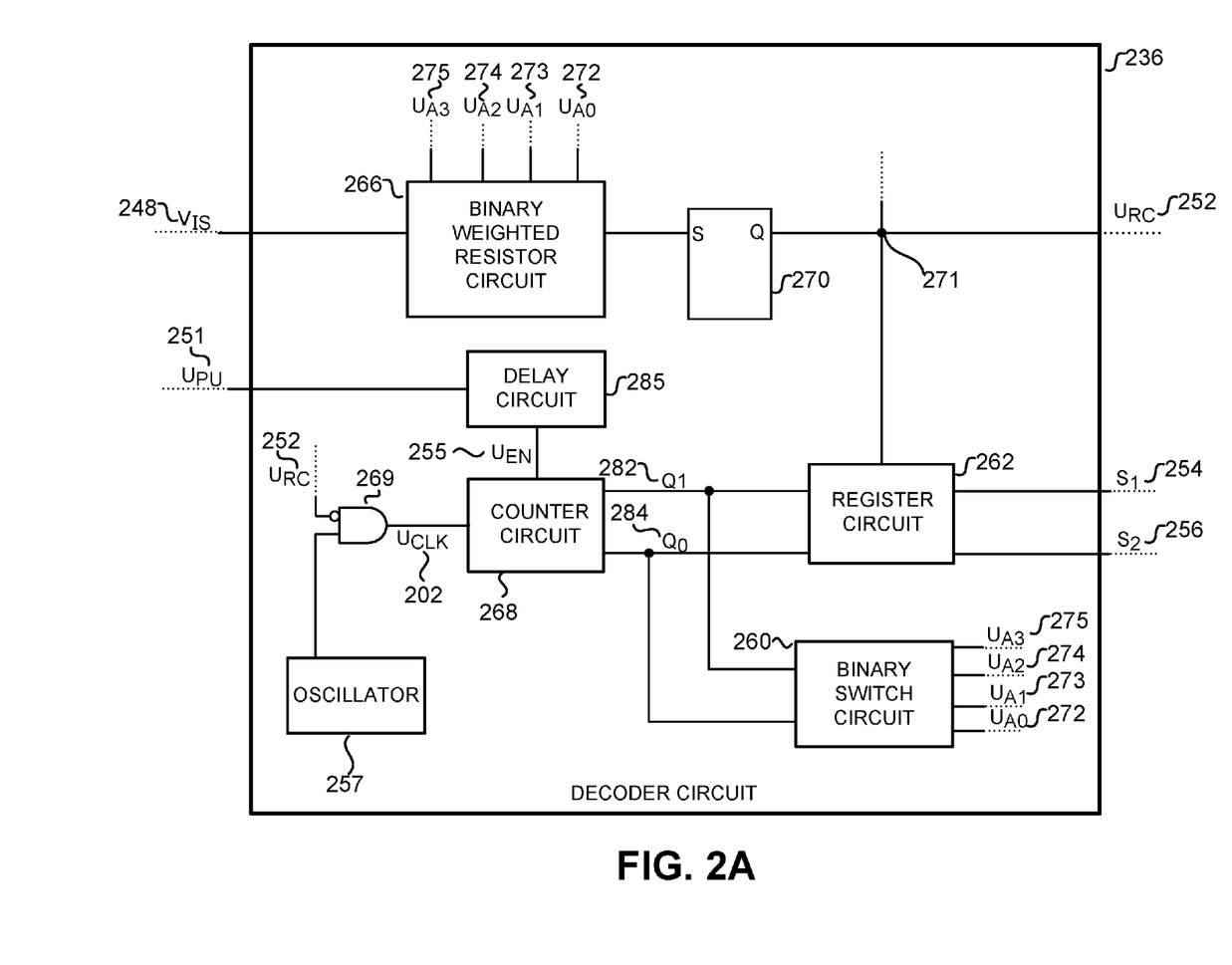
FIG. 2A is a block diagram illustrating one example of a decoder circuit in accordance with the teachings of the present disclosure.

FIG. 2A is a block diagram illustrating one example of a decoder circuit in accordance with the teachings of the present disclosure. The decoder circuit 236 is coupled to receive the sense voltage $V_{IS}$ 248 and the power up signal $U_{PU}$ 251. Further included, the decoder circuit 236 outputs a resistor programming signal $U_{RC}$ 252, and output signals S1 254 and S2 256. Decoder circuit 236 further includes an oscillator 257, a binary switch circuit 260, a register circuit 262, a binary weighted resistor circuit 266, a counter circuit 268, a logic gate 269, a latch 270, and a delay circuit 285.

In operation, the binary weighted circuit 266 is coupled to receive the sense voltage $V_{IS}$ 248, and set a latch 270 once the sense voltage $V_{IS}$ 248 is determined. Binary weighted circuit 266 is coupled to receive switching signals $U_{A0}$ 272, $U_{A1}$ 273, $U_{A2}$ 274, and Um 275 for controlling the internal circuitry of binary weight circuit 266. Further details of the binary weighted circuit 266 will be provided in FIG. 2B.

FIG. 2A also includes a counter circuit 268 that is coupled to receive the output of logic gate 269, the output of delay circuit 285, and output signals Q0 282 and Q1 284. In one example, counter circuit 268 is a ripple counter. The output of logic gate 269 may provide a clock signal for the counter circuit 268. Logic gate 269 is coupled to receive the resistor programming signal $U_{RC}$ 252 and a signal from the oscillator circuit 257. In one example, logic gate 269 is an AND gate with an inverter coupled to one of the inputs. In one example, the clock signal provided at the output of logic gate 269 may be stopped in response to the resistor programming signal $U_{RC}$ 252. Delay circuit 285 is coupled to receive the power up signal $U_{PU}$ 251 and output a delayed enable signal $U_{EN}$ 255 to the counter circuit 268.

Switching signals $U_{A0}$ 272, $U_{A1}$ 273, $U_{A2}$ 274, and $U_{A3}$ 275 are generated by binary switch circuit 260. Binary switch circuit 260 is coupled to receive signals Q0 284 and Q1 282 from counter circuit 268. Counter circuit 268 output signals Q0 284 and Q1 282 to determine the state of switching signals $U_{A0}$ 272, $U_{A1}$ 273, $U_{A2}$ 274, and $U_{A3}$ 275. The current values of Q0 284, Q1 282 are stored onto register circuit 262 once the resistor programming signal $U_{RC}$ 252 is a logic high. Register circuit 262 outputs signals S1 254 and S2 256. In one example, register 262 has a 2-bit output. It is appreciated in other examples, the output register circuit 262 may have any multiple of N bits depending on the required granularity of the binary weighted resistor circuit 266.

Figure 2B:
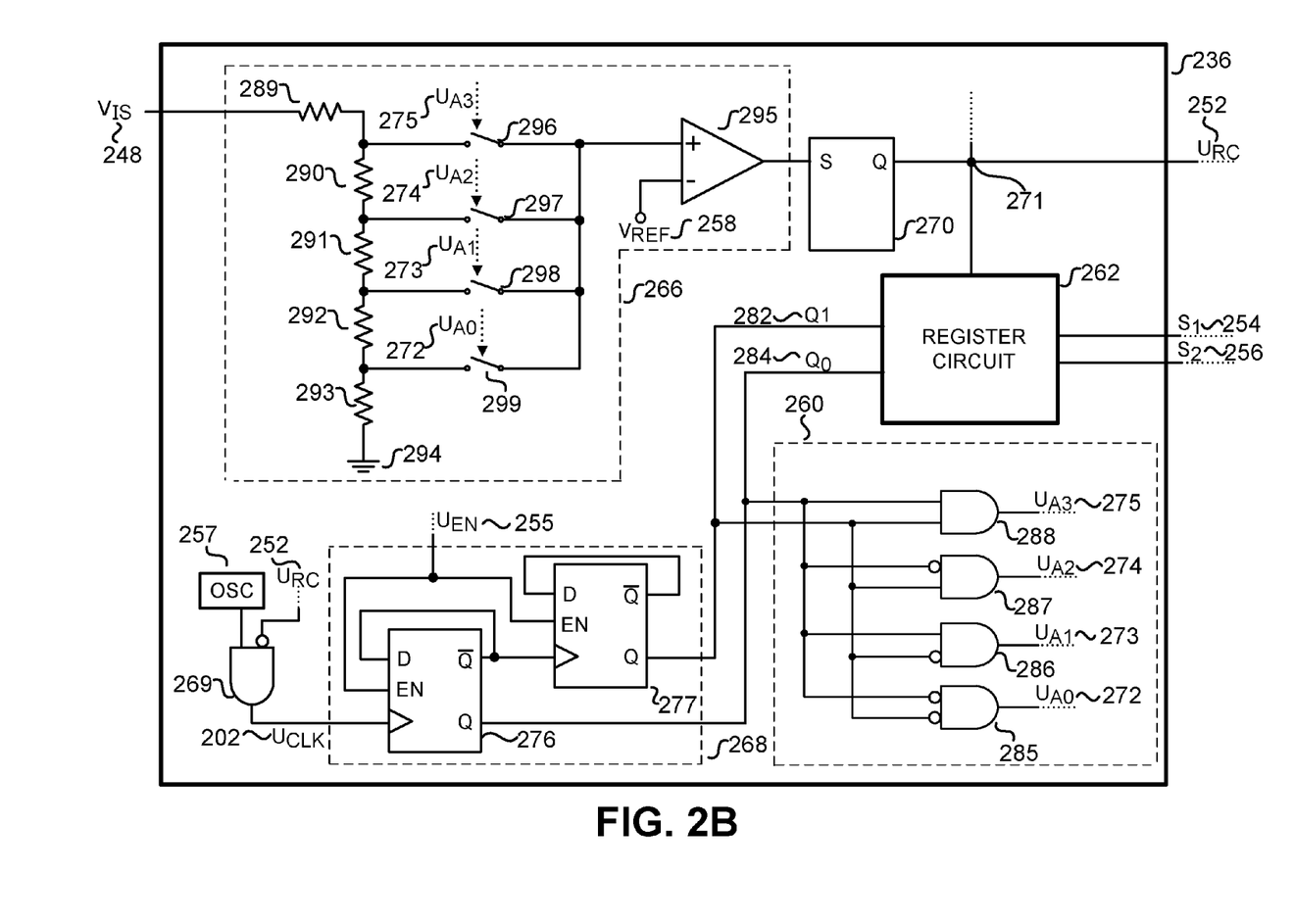
FIG. 2B is a block diagram further illustrating one example of a decoder circuit in accordance with the teachings of the present disclosure.

FIG. 2B further illustrates the decoder circuit as shown in FIG. 2A. The binary weighted circuit 266 includes a switched resistor network that includes resistors 289, 290, 291, 292, 293, switches 296, 297, 289, 299, and a ground reference 294 as shown. Binary weighted circuit 266 is further coupled to receive switching signals $U_{A0}$ 272, $U_{A1}$ 273, $U_{A2}$ 274, and Um 275 from the binary switch 260. The switching signals $U_{A0}$ 272, $U_{A1}$ 273, $U_{A2}$ 274, and $U_{A3}$ 275 open and close switches 296, 297, 298, and 299 respectively.

Counter circuit 268 includes flip flops 276 and 277. As mentioned previously, in one example counter circuit 268 is a ripple counter. In other examples, counter circuit 268 is a binary coded decimal counter, a linear feedback shift register counter, or a Gray-code counter. The enable signal $U_{EN}$ 255 enables flip flops 276 and 277. Flip flop 276 is coupled to receive the output of logic gate 269 as the clock input. The inverted output of flip flop 276 is coupled to the D input of flip flop 276 and the clock input of flip flop 277. The non-inverted output of flip flop 276 outputs a signal Q0 284. The inverted output of flip flop 277 is coupled to the D input of flip flop 277. The non-inverted output of flip flop 277 outputs a signal Q1 282.

Binary switch circuit 260 is coupled to receive signals Q0 284 and Q1 282 from counter circuit 268 and further includes logic gates 285, 286, 287, and 288. Logic gates 285, 286, 287, 288 are coupled to output $U_{A0}$ 272, $U_{A1}$ 273, $U_{A2}$ 274, $U_{A3}$ 275 in response to signals Q0 284 and Q1 282. In one example, logic gate 285 is an AND gate with an inverter coupled to both inputs. In one example, logic gates 286, 287 is an AND gate with an inverter coupled to one of the inputs. In one example, logic gate 288 is an AND gate.

In operation, switching signals $U_{A0}$ 272, $U_{A1}$ 273, $U_{A2}$ 274, and $U_{A3}$ 275 open and close switches 296, 297, 298, and 299. In order to determine the set point of the sense voltage $V_{IS}$ 248, one switch is closed at a time in response to the counter circuit 268. For example, with a logic low signal of Q0 284 and Q1 282, switching signal $U_{A0}$ 272 is a logic high. The switching signal $U_{A0}$ 272 closes switch 299, and all the other switches 296, 297, and 298 of the binary weighted resistor 266 remain open. Comparator 295 is coupled to receive the sense voltage $V_{IS}$ 248 at the non-inverting input through corresponding resistors of binary weighted resistor 266, and is coupled to a voltage reference $V_{REF}$ 258 at the inverting input. If the sense voltage $V_{IS}$ 248 received at the non-inverting input of comparator 295 is greater than the voltage reference $V_{REF}$ 258, the output of comparator 295 is a logic high. The output of comparator 295 sets the latch 270, and the output signal $U_{RC}$ 252, stops the counter circuit 268 from counting up from logic gate 269 and the current value of signal Q0 284 and Q1 282 are stored in the register circuit 262. In one example, an operating parameter of the power converter, such as for example the constant current profile, is set in response to the value of signal Q0 284 and Q1 282 stored in the register circuit 262 after the counter circuit 268 is stopped from counting.

If the sense voltage $V_{IS}$ 248 received at the non-inverting input of comparator 295 is not greater than the voltage reference $V_{REF}$ 258, the output of comparator 295 is a logic low. Counter circuit 268 counts up such that signal Q1 282 is a logic low, and signal Q0 284 is a logic high. The switching signal UM 273 from logic gate 286 is a logic high and closes switch 298 in the binary weighted resistor circuit 266. This process continues until the sense voltage $V_{IS}$ 248 received at the non-inverting input of comparator 295 is greater than the voltage reference $V_{REF}$ 258 by closing switches 297 or 296.

Figure 3:
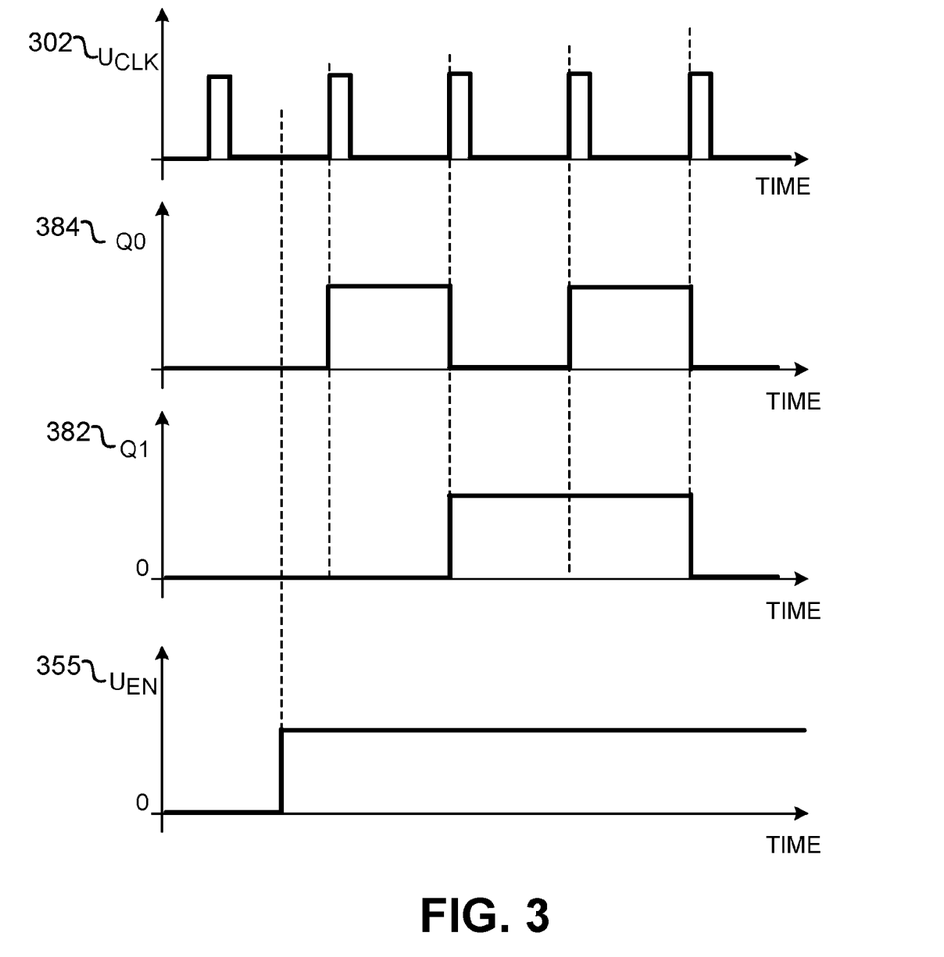
FIG. 3 is a timing diagram of one example of a counter circuit in accordance with the teachings of the present disclosure.

FIG. 3 is a timing diagram of the counter circuit in accordance with the teachings of the present invention. The first timing diagram is the clock signal $U_{CLK}$ 302, which may be an example of clock signal $U_{CLK}$ 202 of the counter circuit shown in FIG. 2A and FIG. 2B. The second timing diagram illustrates the counter output signal Q0 384, which may be an example of counter output signal Q0 284 of the counter circuit shown in FIG. 2A and FIG. 2B. The third timing diagram illustrates the counter output signal Q1 382, which may be an example of counter output signal Q1 282 of the counter circuit shown in FIG. 2A and FIG. 2B. The fourth timing diagram illustrates the enable signal $U_{EN}$ 355, which may be an example of enable signal $U_{EN}$ 255 of the counter circuit shown in FIG. 2A and FIG. 2B. In operation, the counter output signals change at each clock cycle when the enable signal $U_{EN}$ 355 is a logic high. In the first clock cycle of $U_{CLK}$ 302, the enable signal $U_{EN}$ 355 is a logic low. Therefore, the counter circuit does not increment, and the output signals Q0 384 and Q1 382 remain logic low. At some time before the second clock cycle of $U_{CLK}$ 302, the enable signal $U_{EN}$ 355 transitions to a logic high. At the second clock cycle of $U_{CLK}$ 302, counter output signal Q0 384 transitions to a logic high and Q1 382 remains logic low. At the third clock cycle of $U_{CLK}$ 302, output signal Q0 384 transitions to a logic low, and output signal Q1 382 transitions to a logic high. At the fourth clock cycle of $U_{CLK}$ 302, output signal Q0 384 transitions to a logic high, and output signal Q1 382 remains a logic high. At the fifth clock cycle of $U_{CLK}$ 302, both output signals Q0 384 and Q1 382 transition to a logic low.

Figure 4:
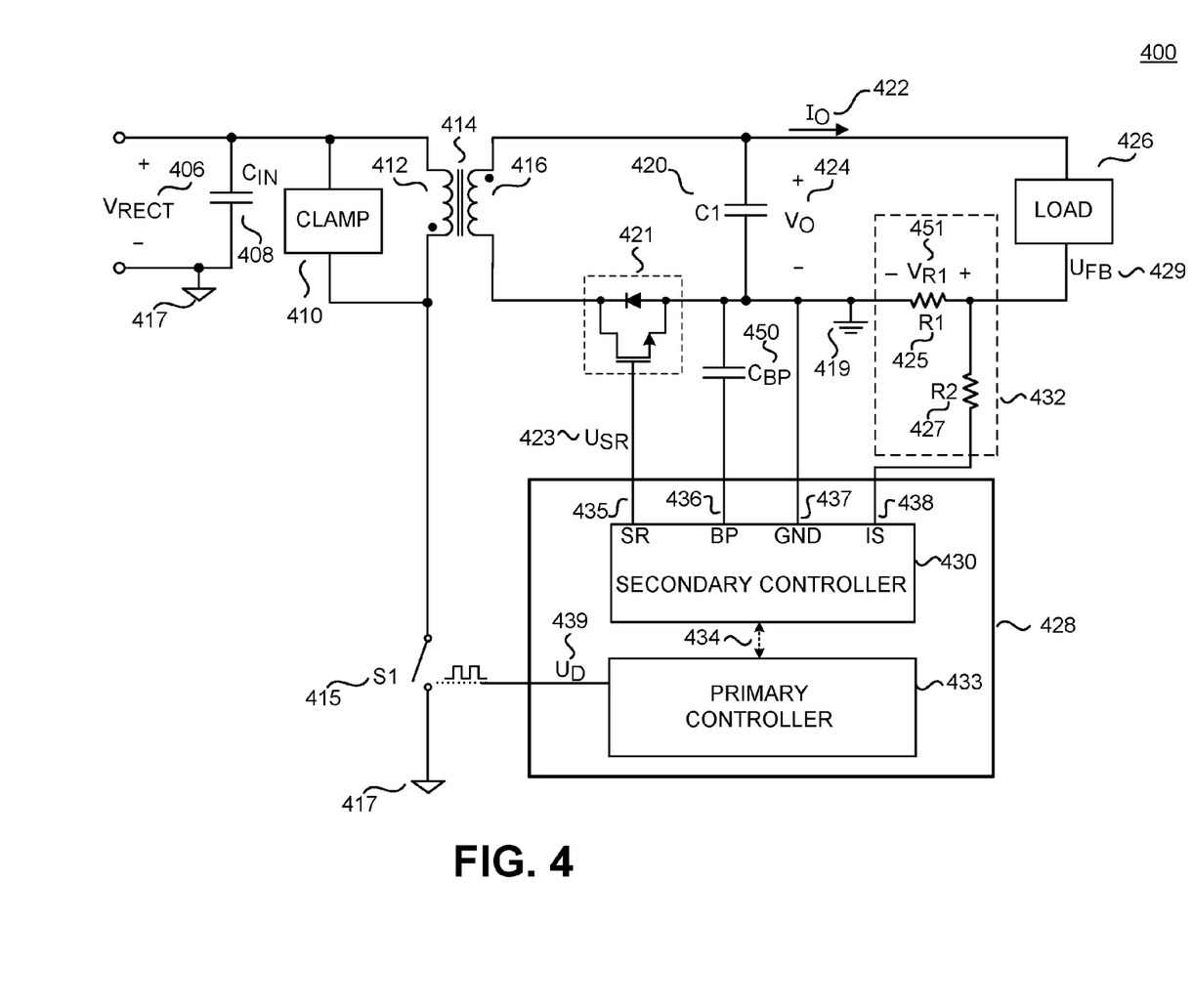
FIG. 4 is a functional block diagram of one example of a power converter including a secondary controller coupled to an external current sense resistor in accordance with the teachings of the present disclosure.

FIG. 4 shows a schematic of one example of a flyback switch mode power converter that includes a primary controller coupled to a secondary controller in accordance with the teachings of the present invention. As shown in the depicted example, power converter 400 further includes an input capacitor $C_{IN}$ 408, an input return 417, a clamp circuit 410, an energy transfer element 414, a primary winding 412, a secondary winding 416, a power switch S1 415, an output capacitor C1 420, a synchronous rectifier 421, a secondary ground 419, and a load 426. Further illustrated in FIG. 4 is the rectified input voltage $V_{RECT}$ 406, output voltage $V_O$ 424, output current $I_O$ 422, secondary drive signal $U_{SR}$ 423, and a feedback signal $U_{FB}$ 429. Controller 428 is further illustrated as including the primary controller 433 and the secondary controller 430 with a communication link 434 between the primary controller 433 and secondary controller 430. As illustrated, the secondary controller 430 further includes terminals 435, 436, 437, and 438. As shown in the depicted example, energy transfer element 414 is coupled between an input of power converter 400 and the load 426 coupled to an output of power converter 400. Energy is transferred from the input of power converter 400 to the output of power converter 400 through the energy transfer element 414 to the load 426 in response to the switching of power switch S1 415 and synchronous rectifier 421. In other examples that do not use a synchronous rectifier 421, a diode or Schottky diode can be used instead.

In one example, the synchronous rectifier 421 is coupled to receive the secondary drive signal $U_{SR}$ 423 from the secondary controller 430 through terminal 435. In one example, terminal 436 may be coupled to receive power through bypass capacitor $C_{BP}$ 450 to the secondary controller 430. In one example, terminal 437 may provide an electrical connection to the negative power rail of the secondary side provide a ground reference relative to secondary controller 430. In one example, terminal 438 is coupled to receive the feedback signal $U_{FB}$ 429 via the current to voltage circuit block 432, and operate as a current sense terminal for measuring the output current $I_O$ 422. In one example, current to voltage circuit 432 is a resistor divider including a first resistor R1 425 and a second resistor R2 427. In one example, the second resistor R2 427 may be an external resistor used to program an operating parameter (e.g., a constant current profile) during a startup mode of the power converter 400, and the external resistor may then be used to sense the output current Io 422 of the power converter 400 after the startup mode is complete.

As shown in the example depicted in FIG. 4, the synchronous rectifier 421 is coupled to the secondary winding 416 and the output capacitor C1 420. In the example shown, the synchronous rectifier 421 includes a switch (exemplified as a transistor) and a corresponding body diode. In one example, the diode may be an externally connected Schottky diode. The synchronous rectifier 421 is coupled to receive the secondary drive signal $U_{SR}$ 423 from the secondary controller 430. Primary controller 433 and the secondary controller 430 may be implemented as monolithic integrated circuit 428 or may be implemented with discrete electrical components or a combination of discrete and integrated components. Primary controller 433, secondary controller 430, and switch S1 415 could form part of an integrated circuit that is manufactured as either a hybrid or monolithic integrated circuit. However it should be appreciated that both the primary controller 433 and the secondary controller 430 need not be included in a single controller package.

The primary controller 433 is coupled to output the drive signal $U_D$ 439 to control switching of the power switch S1 415, and secondary controller 430 is coupled to output the secondary drive signal $U_{SR}$ 423 to control switching of the synchronous rectifier 421. Primary controller 433 and secondary controller 430 may communicate via a communication link 434.

In one example, secondary controller 430 may perform the operations described in FIG. 1. In one example, the voltage $V_{(R1+R2)}$ 451 across the first resistor R1 425 and second resistor R2 427 provides a sense voltage $V_{IS}$ as described in FIG. 1. During startup, the voltage $V_{(R1+R2)}$ 451 across the first resistor R1 425 can be determined by sourcing a current from secondary controller 430 from terminal 438 to secondary ground terminal 437. The sensed voltage of $V_{(R1+R2)}$ 451 is then processed by secondary controller 430 to set a parameter such as a CC profile. After startup is complete, terminal 437 may provide a ground reference for secondary controller 430. In one example, controller 428 is coupled to generate drive signal $U_D$ 439 to control switching of the power switch S1 415, and secondary drive signal $U_{SR}$ 423 to control switching of the synchronous rectifier 421 to control the transfer of energy through energy transfer element 414 from the input of power converter 400 to the load 426 coupled to the output of power converter 400 in response to the measured output current $I_O$ 422 utilizing the set CC profile parameter as determined above in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
   an initialization circuit coupled to a sense terminal coupled to an external resistor to receive a sense voltage from the external resistor during a startup mode of the power converter, wherein the sense terminal is coupled to sense an output current of the power converter after the startup mode of the power converter is complete; and
   a decoder circuit coupled to receive the sense voltage from the initialization circuit during the startup mode of the power converter, wherein the decoder circuit is coupled to sense a voltage across the external resistor during the startup mode of the power converter to determine a value of the external resistor to set an operating parameter of the power converter in response to the value of the external resistor, wherein the decoder circuit comprises:
      a counter circuit coupled to generate a counter output in response to a clock signal;
      a binary switch circuit coupled to generate switching signals in response to the counter output; and
      a binary weighted resistor coupled to receive the switching signals and the sense voltage, wherein the binary weighted resistor is coupled to stop the counter circuit from counting in response to a comparison responsive to the sense voltage and the switching signals, wherein the operating parameter of the power converter is set in response to a value of the counter output after the counter circuit is stopped from counting.

2. The controller of claim 1, wherein the initialization circuit includes a current source coupled to provide a current to the external resistor during the startup mode of the power converter to sense the sense voltage during the startup mode of the power converter.

3. The controller of claim 1, further comprising a constant current comparator coupled to sense the output current of the power converter after the startup mode of the power converter is complete to regulate the output current of the power converter according to a constant current profile set in response to the value of the external resistor.

4. The controller of claim 1, wherein the external resistor is included in an external current to voltage circuit coupled to the controller.

5. The controller of claim 1, wherein the binary weighted resistor comprises:
   a switched resistor network coupled to receive the sense voltage and the switching signals, wherein an output of the switched resistor network is responsive to the sense voltage and the switching signals;
   a comparator having a first input coupled to receive a reference voltage, and a second input coupled to the switched resistor network, wherein an output of the comparator is coupled to stop the counter circuit from counting in response to a comparison of the output of the switched resistor network and the reference voltage.

6. The controller of claim 1, wherein the decoder circuit further comprises:
   a latch coupled to be set in response to an output of the binary weighted circuit; and
   a register circuit coupled to the latch and the counter circuit, wherein the register circuit is coupled to output a binary code in response to the latch and the value of the counter output after the counter circuit is stopped from counting to set the operating parameter of the power converter.

7. The controller of claim 6, wherein the decoder circuit further comprises an oscillator coupled to a logic gate to generate the clock signal, wherein the logic gate is further coupled to the latch to stop the clock signal to stop the counter circuit from counting in response to the sense voltage and the switching signals.

8. The controller of claim 1, wherein the counter circuit is a ripple counter.

9. A power converter, comprising:
   an energy transfer element coupled between an input of the power converter and an output of the power converter;
   a power switch coupled to the energy transfer element; and
   a controller coupled to the power switch to control switching of the power switch to regulate a transfer of energy from the input of the power converter to the output of the power converter, wherein the controller includes:
      an initialization circuit coupled to a sense terminal of the controller coupled to an external resistor to receive a sense voltage from the external resistor during a startup mode of the power converter, wherein the sense terminal is coupled to sense an output current of the power converter after the startup mode of the power converter is complete; and
      a decoder circuit coupled to receive the sense voltage from the initialization circuit during the startup mode of the power converter, wherein the decoder circuit is coupled to sense a voltage across the external resistor during the startup mode of the power converter to determine a value of the external resistor to set an operating parameter of the power converter in response to the value of the external resistor, wherein the decoder circuit comprises:
         a counter circuit coupled to generate a counter output in response to a clock signal;
         a binary switch circuit coupled to generate switching signals in response to the counter output; and a binary weighted resistor coupled to receive the switching signals and the sense voltage, wherein the binary weighted resistor is coupled to stop the counter circuit from counting in response to a comparison responsive to the sense voltage and the switching signals, wherein the operating parameter of the power converter is set in response to a value of the counter output after the counter circuit is stopped from counting.

10. The power converter of claim 9, wherein the energy transfer element includes a first winding coupled to the input of the power converter, and a second winding coupled to the output of the power converter.

11. The power converter of claim 10, wherein the power switch is a first switch coupled to the first winding, wherein the power converter further includes a second switch coupled to the second winding, wherein the second switch is a synchronous rectifier.

12. The power converter of claim 11, wherein the controller includes a primary controller coupled to generate a first drive signal coupled to control switching of the first switch, and wherein the controller further includes a secondary controller coupled to generate a secondary drive signal coupled to control switching of the second switch.

13. The power converter of claim 9, wherein the initialization circuit includes a current source coupled to provide a current to the external resistor during the startup mode of the power converter to sense the sense voltage during the startup mode of the power converter.

14. The power converter of claim 9, wherein the controller further comprises a constant current comparator coupled to sense the output current of the power converter after the startup mode of the power converter is complete to regulate the output current of the power converter according to a constant current profile set in response to the value of the external resistor.

15. The power converter of claim 9, wherein the external resistor is included in an external current to voltage circuit coupled to the controller and coupled to the output of the power converter.

16. The power converter of claim 9, wherein the binary weighted resistor comprises:
a switched resistor network coupled to receive the sense voltage and the switching signals, wherein an output of the switched resistor network is responsive to the sense voltage and the switching signals;
a comparator having a first input coupled to receive a reference voltage, and a second input coupled to the switched resistor network, wherein an output of the comparator is coupled to stop the counter circuit from counting in response to a comparison of the output of the switched resistor network and the reference voltage.

17. The power converter of claim 9, wherein the decoder circuit further comprises:
a latch coupled to be set in response to an output of the binary weighted circuit; and
a register circuit coupled to the latch and the counter circuit, wherein the register circuit is coupled to output a binary code in response to the latch and the value of the counter output after the counter circuit is stopped from counting to set the operating parameter of the power converter.

18. The power converter of claim 17, wherein the decoder circuit further comprises an oscillator coupled to a logic gate to generate the clock signal, wherein the logic gate is further coupled to the latch to stop the clock signal to stop the counter circuit from counting in response to the sense voltage and the switching signals.

* * * * *